US009107533B2

(12) United States Patent
Volz et al.

(10) Patent No.: US 9,107,533 B2
(45) Date of Patent: Aug. 18, 2015

(54) AUTOMATIC MILK FOAMER

(75) Inventors: Martin Volz, Lenningen (DE); Martin Mueller, Eningen (DE); Martin J. Shepherd, Hong Kong (HK)

(73) Assignee: Martin Müller, Eningen (DE)

( * ) Notice: Subject to any disclaimer, the term of this patent is extended or adjusted under 35 U.S.C. 154(b) by 999 days.

(21) Appl. No.: 12/809,956

(22) PCT Filed: Nov. 6, 2008

(86) PCT No.: PCT/EP2008/009358
§ 371 (c)(1),
(2), (4) Date: Sep. 3, 2010

(87) PCT Pub. No.: WO2009/083063
PCT Pub. Date: Jul. 9, 2009

(65) Prior Publication Data
US 2010/0326284 A1    Dec. 30, 2010

(30) Foreign Application Priority Data

Dec. 21, 2007   (DE) .......................... 10 2007 063 549

(51) Int. Cl.
*A21B 7/00*       (2006.01)
*A47J 27/62*      (2006.01)
(Continued)

(52) U.S. Cl.
CPC ............ *A47J 27/004* (2013.01); *A47J 43/0465* (2013.01); *A21B 7/005* (2013.01); *A47J 31/401* (2013.01); *A47J 31/4485* (2013.01); *A47J 37/0611* (2013.01)

(58) Field of Classification Search
CPC ..... A47J 31/4485; A47J 31/401; A47J 27/62; A47J 27/18; A47J 37/0814; A47J 37/0821; A47J 37/0611; A47J 43/145; A47J 19/027; A21B 1/48; A21B 7/005; A23L 1/0128; A23G 1/10; A23N 4/04; A23N 1/003
USPC .................... 99/323.1, 323.3, 324–333, 348, 99/484–486, 509–511
See application file for complete search history.

(56) References Cited

U.S. PATENT DOCUMENTS

| 3,436,506 | A  | * | 4/1969  | Smith ............................ 219/753 |
| 3,884,135 | A  | * | 5/1975  | Lohr et al. ........................ 99/348 |
| 5,658,478 | A  | * | 8/1997  | Roeschel et al. ............... 219/502 |
| 6,550,372 | B1 | * | 4/2003  | Sharples ......................... 99/331 |
| 6,616,324 | B1 | * | 9/2003  | Planca et al. .................. 366/205 |
| 6,640,692 | B1 | * | 11/2003 | Hilgers et al. .................. 99/348 |

FOREIGN PATENT DOCUMENTS

| DE | 19624648 | 1/1998 |
| EP | 1731068  | 12/2006 |

(Continued)

OTHER PUBLICATIONS

International Search Report for Application No. PCT/EP2008/009358 dated Jan. 29, 2009 (6 pages).

*Primary Examiner* — Dana Ross
*Assistant Examiner* — Hemant Mathew
(74) *Attorney, Agent, or Firm* — Michael Best & Friedrich LLP

(57) ABSTRACT

The invention relates to an automatic milk foamer having a container for receiving milk and a base body on which or in which the container can be placed. The milk foamer also includes a stirring device that can be placed in the container for foaming the milk, a motor provided in the base body for driving the stirring device, and a heating device for warming the milk present in the container. The heating device includes an alternating magnetic field generator provided in the base body for generating an alternating magnetic field. The container is designed such that it heats up due to the alternating magnetic field.

11 Claims, 4 Drawing Sheets

(51) Int. Cl.
| | |
|---|---|
| A47J 37/06 | (2006.01) |
| A23F 3/00 | (2006.01) |
| A23L 2/54 | (2006.01) |
| B01F 3/04 | (2006.01) |
| A23F 5/00 | (2006.01) |
| A47J 27/00 | (2006.01) |
| A47J 43/046 | (2006.01) |
| A47J 31/44 | (2006.01) |
| A47J 31/40 | (2006.01) |

(56) References Cited

FOREIGN PATENT DOCUMENTS

| EP | 1731068 A1 | * | 12/2006 | | |
|---|---|---|---|---|---|
| JP | 2004261254 | | 9/2004 | | |
| WO | 2006050900 | | 5/2006 | | |
| WO | WO 2006050900 A1 | * | 5/2006 | .............. | A47J 27/00 |
| WO | 2006124051 | | 11/2006 | | |

* cited by examiner

AUTOMATIC MILK FOAMER

CROSS REFERENCE TO RELATED APPLICATIONS

This patent application is a national stage filing under 35 U.S.C. 371 of International Application No. PCT/EP2008/009358, filed Nov. 6, 2008, which claims foreign priority to German Patent Application No. 102007063549.6, filed Dec. 21, 2007, the disclosures of which are incorporated by reference herein in their entireties. Priority to each application is hereby claimed.

DESCRIPTION

The invention is an automatic milk foamer with a container for the intake of milk, with a base on or in which the container can be placed, with a stirring device to foam the milk that can be inserted in the container. A motor to drive the stirring device can be provided in the base, as well as a heating device to heat any milk present in the container.

Such milk foamers, which are available as portable units, are already known in the current state of the art, for example from WO 2006/050900 A1. The disadvantage of such milk foamers is that especially the cleaning of the container is laborious and time-consuming. For example, if the container is not rinsed immediately after the milk has been foamed, milk residue may dry up in the container and form a crust that can lead to a build-up of bacteria and germs. Since the container features electric and/or electronic components, in particular in the form of the heating unit, it is not possible, for example, to submerge the container in a cleaning solution or to clean it in a dishwasher.

From the EP 1 731 068 A1, a cooking mixer with a container that can be detached from a base is known. Only induction heating was provided to heat the food products present in the container. Similar cooking mixers are known from the JP 2004 261254 A and the WO 2006/124051 A.

SUMMARY OF THE INVENTION

The present invention addresses the problem of providing a milk foamer, as mentioned above, that is easier to handle for the user.

This invention solves this problem with a milk foamer with the characteristics of claim 1.

Such a milk foamer has the advantage that the electric or electronic components of the heating unit are not included in or on the container, but are exclusively housed within the base. Due to a suitable material selection of the container it can still be guaranteed, however, that a reliable and rapid heating of the milk present in the container will take place.

The container is thus preferably free of electric or electronic components as well as of electric connections. Such a container has the advantage that it can be submerged in cleaning solution for cleaning purposes or put in a dishwasher.

To achieve a suitable heating effect, parts of the container or the container can be manufactured, at least in part, out of electrically conductive and/or ferromagnetic materials.

It is especially advantageous if the bottom of the container is manufactured, at least in part, out of a ferromagnetic and/or electrically conductive material. In this case, the alternating field generator will be situated in the base in the area in which the bottom of the container rests on the base. Using the alternating field generator, the bottom of the container can then be heated, causing any milk present in the container to be heated. The use of ferromagnetic material has the advantage that a bundling of the magnetic alternating field can be generated in such a way that a rapid heating of the bottom of the container and thus of the milk occurs.

Preferably, the entire bottom of the container should be made of a ferromagnetic plate. The thickness of the bottom in this case needs to be adjusted with respect to the type and intensity of the generated magnetic alternating field.

In an additional advantageous embodiment of the invention, additionally or alternatively it can be provided that the container wall or parts of it are made of a ferromagnetic or electrically conductive material and that the base can have a nest-like depression to receive the container. The base has a wall section essentially running parallel to the wall of the container behind which the alternating field generator is situated. As a consequence of the alternating field, a heating of the wall of the container or a section of the wall is achieved. This has the decisive advantage that construction volume is saved in the area underneath the container. Especially the area of the base below the container can house a range of components, for example an electric motor to power the stirring device. This means that construction volume can be saved through the arrangement of the alternating field generator essentially parallel to the wall of the container. In addition, with this construction design a container with a small footprint and a comparatively great height can be created. The surface of the wall of the container, which is heated due to the magnetic alternating field, can thus be bigger than the surface of the bottom. This means that a better and more even heating of the milk present in the container can be achieved. An additional advantage is that other components present in the base portion, such as in particular an electric motor, can be arranged at a greater distance from the alternating field generator. In this case it is to be taken into account that the alternating field generator emits a magnetic alternating field in all spatial directions. This means that it can indeed occur that electrically conductive components, such as in particular an electric motor housed in the casing, may be subject to an undesirable heating effect if they are arranged close to the alternating field generator. Especially because the alternating field generator is arranged in parallel to the wall of the container in the area of the nest-like depression it can be arranged comparatively far from other electrically conductive components.

In this case, the alternating field generator can be arranged directly on the corresponding wall section of the base or can also be arranged at a distance from this. Depending on the desired intensity of the generated magnetic alternating field, a corresponding calibration is possible.

The alternating field generator can be designed as an induction coil that surrounds the wall section that forms the depression on the base in ring-form at least in part. This guarantees that the wall of the container or, as the case may be, parts thereof is or are evenly heated. The alternating field generator can in this case be realized as a single-layer induction coil.

In addition it is advantageous if the alternating field generator with the container recessed in the depression covers a part of the wall of the container that lies in a range from a quarter to three quarters of the wall of the container. The covered part of the wall of the container is then preferably constructed out of an electrically conductive and/or magnetic material. This provides a sufficiently large surface that is heated due to the magnetic alternating field.

In another embodiment of the invention it is advantageous if the alternating field generator with the container recessed in the depression covers a part of the wall of the container that is greater than the part of the wall of the container that is covered by the milk present in the container when the milk foamer is not in operation and the maximum permissible filling volume of milk is present in the container. If the stirring device is not rotating, then as a result sections of the container wall are also heated that are not in contact with the milk. If, however, the stirring device is switched on, then the milk rises up the wall of the container due to the rotating movement. Milk is then also heated on the part of the container wall that is wetted by the milk when the stirring device is not rotating. On the whole, this results in a comparatively large surface that is heated by the alternating field, which leads to a rapid and even heating of the milk.

In another embodiment of the invention it is provided that those sections of the wall or the bottom of the container that do not serve to heat the milk present in the container are at least in part made out of glass. This makes it possible to observe the milk foam created in the container while it is being made and to check in a very simple way whether the milk foam has a suitable consistency or possibly whether sufficient milk foam was prepared.

In an especially preferred embodiment, the entire bottom of the container and the section of the container wall is connected to the bottom of the container, which can be approximately a quarter to three quarters of the height of the container, made of a single piece of an electrically conductive, and in particular ferromagnetic, material. The remaining container wall stretching up from that point is preferably made out of glass.

According to the invention, alternating field generators can be provided principally in such a way that both the bottom as well as the container wall are heated. This means that as a whole the area of the container that is being heated is comparatively large, which leads to a fast and even heating of the milk.

In accordance with the another embodiment of the invention, the bottom of the container on its underside at least in segments features a coating that acts in a heat-insulating way and due to the magnetic alternating field can not be heated or can be heated only a little. The bottom of the container may also have an insulating plate or correspondingly arranged insulation sections. This has the advantage that the container with the hot milk can be removed from the base and placed on a surface, for example a table, without this being heated or damaged due to the hot content of the container. Still, if the part of the bottom of the container that faces the interior is made out of a material that heats up due to the magnetic alternating field, then the bottom of the container and thus the milk are heated.

To power the stirring device, it is advantageous to provide a motor to drive the stirring device in the base.

The stirring device as such should preferably be arranged in such a way that it can be disconnected from the swivel coupling. This would allow the stirring device to be removed before pouring out the milk foam or to clean the container.

The stirring device is swivel-coupled to the motor via a contact-less magnetic coupling. Such a contact-less magnetic coupling has the advantage that no mechanical components run through the entire container; seals are therefore not required.

To realize the magnetic coupling, a raised part facing axially upwards and in particular at least for the most part shaped in cylindrical form needs to be provided. On the side facing away from the interior of the container, a magnet or as the case may be a ferromagnetic material can then be provided on a shaft that is powered by the motor and juts out into the raised part. On the axially or radially opposite side of the raised part in the interior of the container, ferromagnetic or magnetized sections can be provided for swivel coupling the stirring device. The sections interact with the magnetic or the ferromagnetic material in such a way that when the shaft turns, the stirring device is set into a rotating motion. The raised part in the bottom of the container can thus simultaneously serve to store the stirring device in the container.

In one embodiment, the motor is activated in such a way that it runs with a fluctuating rotational speed. This makes it possible that the milk foam being formed will now and again collapse slightly due to the different rotational speeds of the stirring device, thus achieving a better and more even mixing of the milk. It is possible to provide a random number generator for the activation of the motor.

Additional details and advantageous embodiments of the invention can be found in the following description.

DETAILED DESCRIPTION OF THE DRAWINGS

Figure 1:
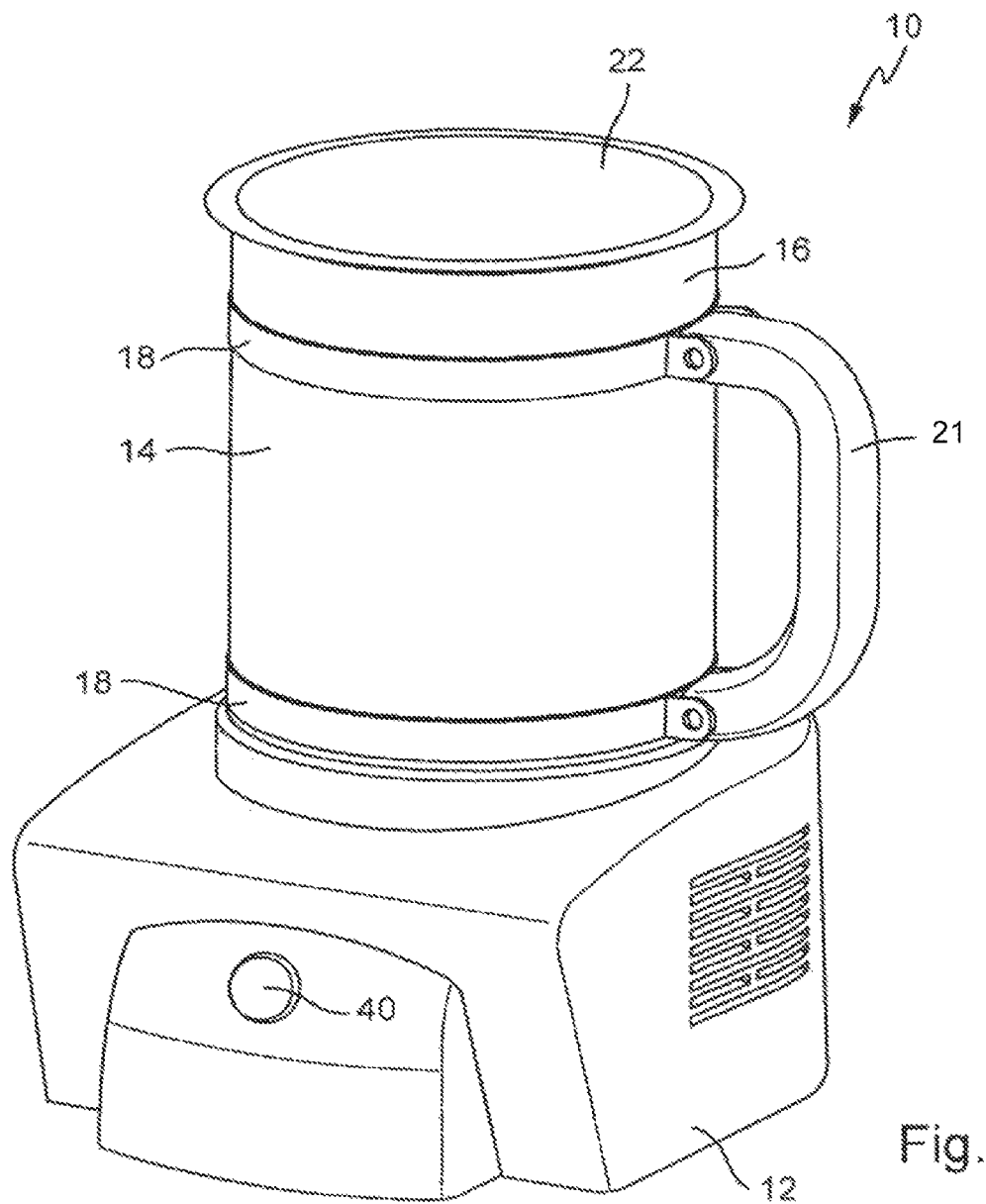
FIG. 1: a perspective view of a milk foamer.

The milk foamer 10 presented in FIG. 1 comprises a base 12 as well as a container 14 that can be placed on the base 12 to take in milk. The cylindrical wall 16 of container 14 is made out of glass. To handle the container 14, two metal bands 18 are provided that encompass the wall 16. Between the bands 18, a handle 21 is provided.

Figure 2:
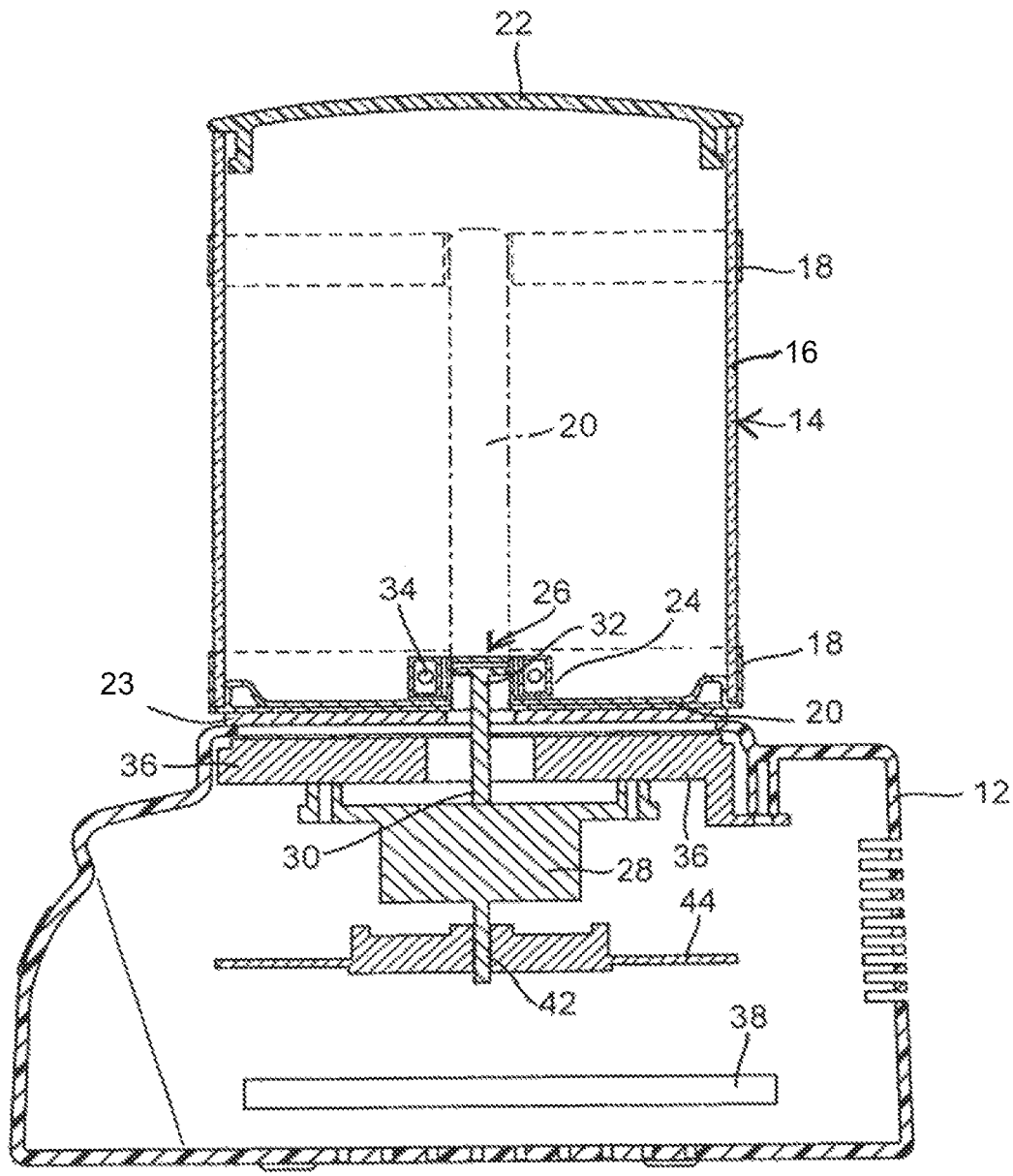
FIG. 2: a longitudinal section through the milk foamer according to FIG. 1.

As illustrated in FIG. 2, the container 14 features a bottom 20 that is made out of a ferromagnetic material and, as shown in FIG. 2, can be double-layered and of a single piece with the lower metal band. The side of the container 14 facing away from the bottom of the container 20 is closed with a detachable lid 22. The bottom 20 of the container on its underside features heat-insulating and electric non-conductive isolation sections in the form of a ceramic plate 23.

Inside the container 14 there is a stirring device 24 that can be taken out of the container 14 in an axial direction. The stirring device 24 in this case is arranged along the central longitudinal axis of the container 14 in a rotatable way in the container 14. On the bottom 20 of the container, a raised part 26 facing axially upwards is provided in a circular cylindrical way. The raised part 26 serves as a bearing pin for the stirring device 24.

As can be seen in FIG. 2, an electric motor 28 is provided in the base 12 to drive a shaft 30. The free end of shaft 30, which features magnetic or magnet sections 32, here juts into the side of the raised part 26 facing away from the interior of the container. The stirring device 24 features the ferromagnetic coupling sections 34 radially opposite to the magnet sections 32. These coupling sections are designed in such a way that if the motor shaft 30 turns with the magnet sections 32, the coupling sections 34 or, as the case may be, the stirring device 24 for the foaming of the milk present in container 14 are set in a rotating motion. The motion coupling between the motor 28 or, as the case may be, the magnet sections 32 and the stirring device 24 or, as the case may be, the coupling sections 34 thus takes place in a contact-less way through the bottom of the container 20 or, as the case may be, the raised part 26 of the container 14. A concrete possibility of a non-contact motion coupling is described, for example, in WO2006/050900 A1. The electric motor 28 on its underside features a shaft section 42 to which a cooling fan 44 is attached.

In the base 12, an alternating field generator 36 is provided to generate a magnetic alternating field. Here the alternating field is generated in such a way that the ferromagnetic bottom 20 of the container 14 heats itself due to the alternating field so that it inductively heats the milk present in the container 14. Such an induction heat arrangement has the advantage that all electric and electronic components are situated within the base 12, so that neither electric or electronic components nor electric connections need to be provided on the container 14. The container 14 is designed in such a way that it can be taken off the base 12 and completely submerged in cleaning solution or cleaned in a dishwasher without being damaged. The stirring device 24 is preferably taken out of the container 14 for cleaning. It is also conceivable that the glass wall 16 along with the bottom 20 of the container and bottom plate 23 can be taken out of the bands 18 in an axial direction, so that only the glass wall 16 along with the bottom 20 of the container and with the bottom plate 23 (which can form an inseparable unit) can be cleaned.

By providing the heat-insulating plate 23, the interior of the bottom 20 of the container is heated for the heating of the milk, but the underside or plate 23 are not heated. This has the advantage that the container 16 with the hot milk can be removed from the base 12 and placed on a surface, for example a table, without this being heated or damaged due to the hot content of the container 16.

In the base 12, a conductor plate 38 is provided that serves to drive the motor 28 and the alternating field generator 36. To start up the milk foamer 10, a start button 40 has been provided at the front of the base 12, as can be clearly seen in FIG. 1. Pushing the start button 40 results in the activation of the electric motor 28 (and thus of stirring device 24) and of the alternating field generator 36 (and thus the heating of bottom 20) in such a way that the milk present in the container 14 is heated and foamed.

The driving of motor 28 here preferably takes place using a random number generator so that a fluctuating rotational speed of the motor and thus of the stirring devices 24 can be achieved. This allows for a better mixing of the foaming milk.

Figure 3:
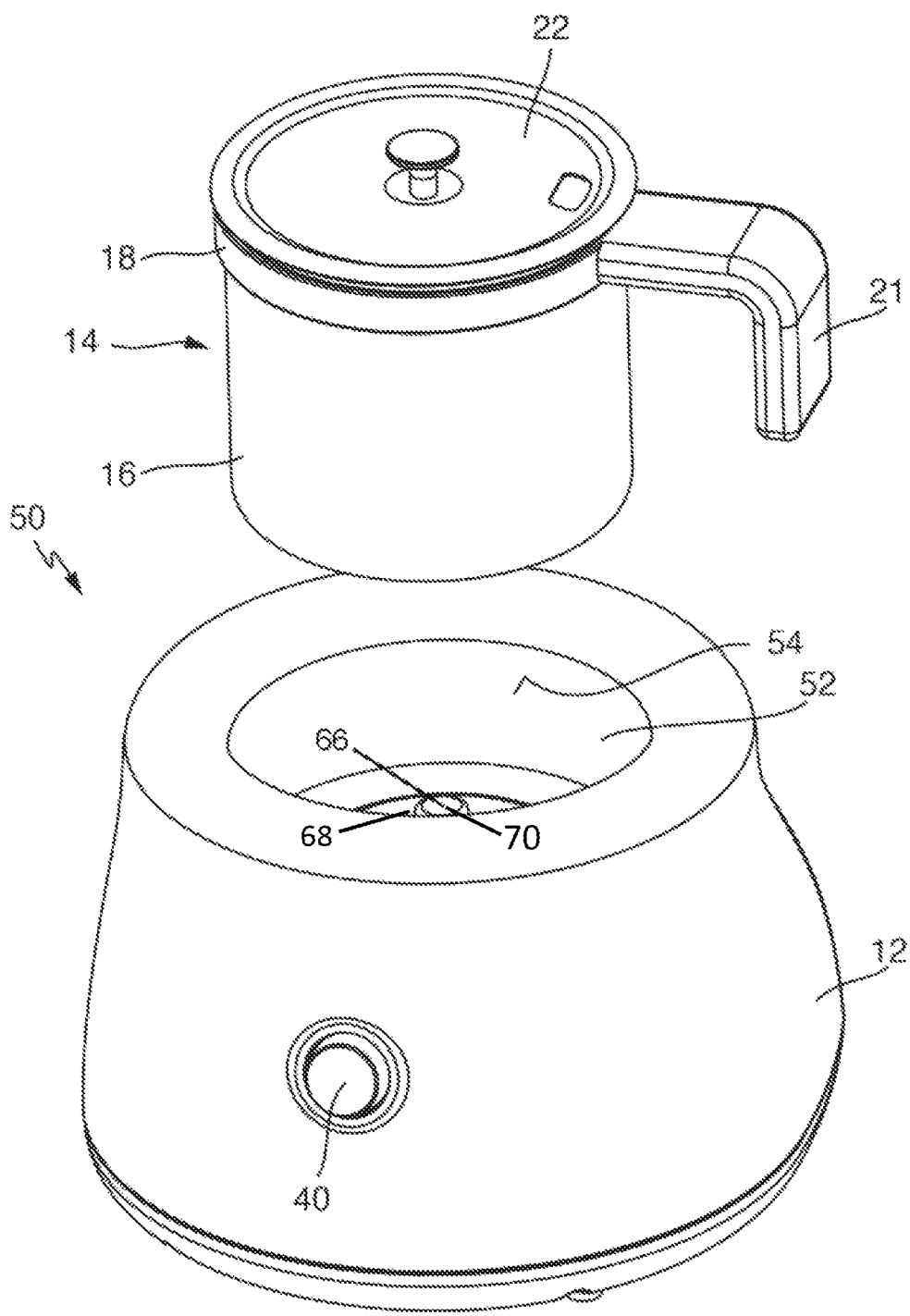
FIG. 3: a perspective view of a second milk foamer.
Figure 4:
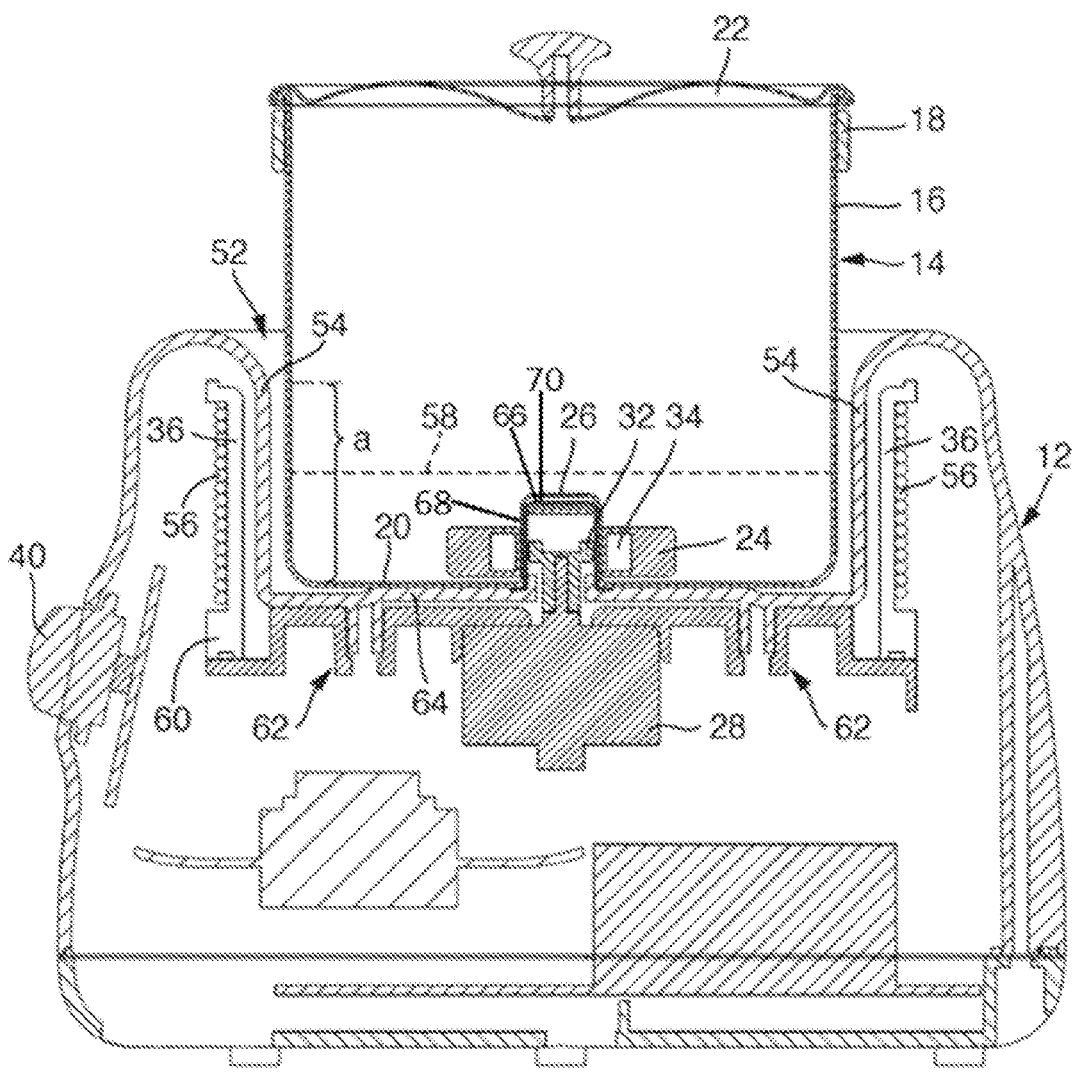
FIG. 4: a longitudinal section through the milk foamer according to FIG. 3.

FIGS. 3 and 4 show a second invention of a milk foamer 50 in which components of this milk foamer 50 are provided with reference numbers that correspond to the reference numbers of the components of the milk foamer 10 in accordance with FIGS. 1 and 2.

As can be seen in FIG. 3, the base 12 of the milk foamer 50 features a nest-like depression 52 to receive the container 14. The depression 52 is surrounded in a radial direction by a ring-shaped wall section 54 that essentially runs parallel to the wall of the container 16. The side of the wall section 54 facing away from the container 14 also features a ring-shaped circumferential alternating field generator 36. The alternating field generator 36 here comprises a single-layered induction coil 56.

Unlike the milk foamer 10 according to FIGS. 1 and 2, in the milk foamer 50 according to FIGS. 3 and 4 the alternating field generator 36 is not situated in the area of the bottom 20 of the container 14, but in the area of the wall 16. The alternating field generator 36 here covers approximately a third of the height of the wall 16 of the container 14, as can be seen in particular in FIG. 4.

To heat the container 16, the design according to FIGS. 3 and 4 consists completely of an electrically conductive material that also has ferromagnetic properties. According to the present invention, it is still conceivable that the upper section of the container 14 or its wall 16 which is not situated opposite the alternating field generator 36 can be made out of glass. This makes it possible to observe the milk present in the container 14 during the foaming process.

The ring-shaped arrangement of the alternating field generator 36 according to FIG. 4 has the advantage that the alternating field generator 36 is further away from the electric motor 28 than is the case with milk foamer 10 according to FIGS. 1 and 2. This results in the undesirable heating of the electric motor 28 due to the present alternating field being less of a problem than it is with milk foamer 10 according to FIGS. 1 and 2, since the alternating field generator there is situated closer to the electric motor 28. In addition, the milk foamer 50 can heat a larger surface of the container 14 than is the case with milk foamer 10, in which the surface to be heated is limited to the ground surface of the bottom of the container 20.

On the whole, milk foamer 50 can thus induce heat into the container 14 in a more even way, which in turn can prevent any undesirable burning of milk in the container 14.

The container 14 can, as indicated in FIG. 4, feature a maximum fill level 58. To ensure that the container 14 does not overflow during the foaming process, milk may only be filled up to this level 58 in the container. As can be seen in FIG. 4, the alternating field generator 36 covers a part of the wall of the container 16 that is greater than the part of the wall of the container 16 that is covered by milk filled up to the level 58. This makes it possible for the milk that rises up along the wall 16 during the foaming process to also be heated. On the whole this results in the surface being impacted by the magnetic field being increased.

As can be seen in FIG. 4, the alternating field generator 36 along with the induction coil 56 can be arranged on a shared support base 60 which is arranged along the wall of the base 12 which forms the bottom 64 of the depression 52 via connecting sections 62. When the container 14 is placed into the depression 53, the bottom 64 of the depression 52 features a raised part 66 with a sidewall 68 and an upper wall 70 completely covering the shaft 30. The raised part 66 extends into the raised part 26 of the container 14. The magnet sections 32 juts into this raised part 66.

The invention claimed is:
1. An automatic milk foamer comprising:
   a container to receive milk, the container having an interior, a bottom, and a wall that circumscribes the bottom of the container;
   a base on or in which the container can be placed;
   a ring-shaped stirring device that can be used in the container to foam the milk, the stirring device being swivel-coupled with a motor via a non-contact magnet coupling; and
   a heating device to heat the milk present in the container, the base having a wall section and a bottom,
   the wall section running essentially parallel to the container wall and forming a depression to receive the container,
   the motor to drive the stirring device provided in the base,
   the heating device including an alternating field generator in the base to generate a magnetic alternating field, with the alternating field generator being arranged behind the wall section that forms the depression and designed as a ring-shaped induction coil that surrounds the wall section at least in part,
   the container wall including a ferromagnetic material, electrically conductive material, or both so that the container can be heated due to the magnetic alternating field, a container-raised part that stretches upwards axially provided on the container bottom, the bottom of the depression having a bottom-raised-part that engages the container-raised-part of the container when the container is inserted in the depression, the container-raised part serving as a bearing pin for the stirring device, a shaft powered by the motor, the shaft positioned on a side of the bottom-raised-part that faces away from the interior of the container, the shaft having a magnetic or a ferromagnetic material and jutting out into the bottom-raised-part, the stirring device having ferromagnetic or magnetized sections, the ferromagnetic or magnetized sections being provided in the interior of the container, radially opposite the magnetic or ferromagnetic material of the shaft, and acting together with the magnetic or ferromagnetic material of the shaft in such a way that when the shaft turns, the stirring device is placed in a rotating motion;

wherein the bottom-raised-part includes a sidewall and an upper wall completely covering the shaft.

2. The milk foamer according to claim 1, marked by the container being free of electric components and electric connections.

3. The milk foamer according to claim 1, wherein the container includes ferromagnetic, electrically conductive material, or both.

4. The milk foamer according to claim 1, the bottom of the container being at least in part made out of a ferromagnetic and/or electrically conductive material and the alternating field generator being provided in the base in the area in which the bottom of the container is placed on the base.

5. The milk foamer according to claim 1, wherein the alternating field generator covers about ¼ to ¾ of the wall of the container when the container is inserted in the depression.

6. The milk foamer according to claim 1, wherein the alternating field generator covers, when the container is inserted in the depression, a part of the wall of the container that is larger than a part of the container wall that is covered by the milk present in the container when the milk foamer is not in operation and when the maximum permissible filling volume of milk is present in the container.

7. The milk foamer according to claim 1, wherein the wall of the container and/or the bottom of the container at least in segments being made out of glass.

8. The milk foamer according to claim 1, wherein an underside of the bottom has at least in segments a coating, a plate, and/or insulation sections that act in a heat-insulating way and due to the magnetic alternating field can not be heated or can be heated only a little.

9. The milk foamer according to claim 1, marked by the motor being activated in such a way that it runs with a fluctuating rotational speed.

10. The milk foamer according to claim 9, marked by a random number generator being provided for the activation of the motor.

11. An automatic milk foamer comprising:

a container to receive milk, the container having an interior, a bottom, and a wall that circumscribes the bottom of the container;

a base on or in which the container can be placed, the base having a wall section and a bottom;

a motor positioned on or in the base;

a heating device to heat the milk present in the container, the wall section of the base running essentially parallel to the container wall and forming a depression to receive the container, the heating device including an alternating field generator to generate a magnetic alternating field, the alternating field generator being arranged behind the wall section that forms the depression and designed as a ring-shaped induction coil that surrounds the wall section at least in part, the container wall including ferromagnetic material, electrically conductive material, or both so that the container can be heated due to the magnetic alternating field;

a ring-shaped stirring device configured to fit in the container to foam the milk, the stirring device being swivel-coupled with the motor via a non-contact magnet coupling, a container-raised-part that stretches axially upwards and provided on the container bottom, the bottom of the depression having a bottom-raised-part engaging the container-raised-part of the container when the container is inserted in the depression, the container-raised part serving as a bearing pin for the stirring device, a shaft connected to and rotated by the motor, the shaft positioned on a side of the bottom-raised-part that faces away from the interior of the container, the shaft including magnetic or a ferromagnetic material and jutting out into the bottom-raised-part, the stirring device having ferromagnetic or magnetized sections, the ferromagnetic or magnetized sections being provided in the interior of the container, radially opposite to the magnetic or ferromagnetic material of the shaft, and acting together with the magnetic or ferromagnetic material of the shaft such that when the shaft rotates, the stirring device rotates wherein the bottom-raised-part includes a sidewall and an upper wall completely covering the shaft.

* * * * *